(12) United States Patent
Ahlbrecht et al.

(10) Patent No.: US 11,789,110 B2
(45) Date of Patent: Oct. 17, 2023

(54) FAULT DETECTION, EXCLUSION, ISOLATION, AND RE-CONFIGURATION OF NAVIGATION SENSORS USING AN ABSTRACTION LAYER

(71) Applicant: Honeywell International Inc., Charlotte, NC (US)

(72) Inventors: Mark A. Ahlbrecht, Minneapolis, MN (US); Mats Anders Brenner, Plymouth, MN (US); Bruce G Johnson, Shoreview, MN (US); Milos Sotak, Košice-Šaca (SK); Zdenek Kana, Dubnany (CZ); James Arthur McDonald, New Brighton, MN (US)

(73) Assignee: Honeywell International Inc., Charlotte, NC (US)

( * ) Notice: Subject to any disclaimer, the term of this patent is extended or adjusted under 35 U.S.C. 154(b) by 45 days.

(21) Appl. No.: 17/410,886

(22) Filed: Aug. 24, 2021

(65) Prior Publication Data
US 2022/0065980 A1    Mar. 3, 2022

Related U.S. Application Data

(60) Provisional application No. 63/074,247, filed on Sep. 3, 2020.

(51) Int. Cl.
*G01S 3/02* (2006.01)
*G01S 5/02* (2010.01)
*G01C 21/16* (2006.01)

(52) U.S. Cl.
CPC .......... *G01S 5/0263* (2013.01); *G01S 5/0264* (2020.05); *G01C 21/165* (2013.01); *G01S 5/0294* (2013.01)

(58) Field of Classification Search
CPC .... G01S 5/0263; G01S 5/0294; G01S 5/0264; G01C 21/165
(Continued)

(56) References Cited

U.S. PATENT DOCUMENTS 7,925,381 B2    4/2011  Murray, IV et al.
9,880,021 B2 *  1/2018  Brenner .............. G01C 21/165
(Continued)

FOREIGN PATENT DOCUMENTS

| CN | 111967486 A | 11/2020 | |
| CN | 112577526 A * | 3/2021 | ............. G01C 25/00 |
| DE | 102021126731 A1 * | 4/2022 | ........... G05D 1/0214 |

OTHER PUBLICATIONS

European Patent Office, "Extended European Search Report from EP Application No. 21193883.2", dated Jan. 31, 2022, from Foreign Counterpart to U.S. Appl. No. 17/410,886, pp. 1 through 11, Published: EP.

(Continued)

*Primary Examiner* — Chuong P Nguyen
(74) *Attorney, Agent, or Firm* — Fogg & Powers LLC

(57) ABSTRACT

Systems and methods for fault detection, exclusion, isolation, and re-configuration of navigation sensors using an abstraction layer are provided. In certain embodiments, a system includes a plurality of sensors that provide redundant sensor measurements, wherein redundancy of the redundant sensor measurements is achieved based on an independence between measurements from different physical sensor units in the plurality of sensors. The system additionally includes a fusion function configured to receive the redundant sensor measurements from each sensor in the plurality of sensors and calculate fused navigation parameters. Further, the system includes an abstraction layer that calculates an estimated state based on the fused navigation parameters, wherein the estimated state comprises safety assessment information for (Continued)

the fused navigation parameters and the fused navigation parameters. Moreover, the system includes a plurality of user systems, wherein each user system in the plurality of user systems receives the estimated state from the abstraction layer.

20 Claims, 6 Drawing Sheets

(58) Field of Classification Search
USPC .......................................................... 342/463
See application file for complete search history.

(56) References Cited

U.S. PATENT DOCUMENTS

| | | | |
|---|---|---|---|
| 10,191,738 | B1 | 1/2019 | Milota et al. |
| 10,760,911 | B2* | 9/2020 | Kana ........................ G01S 19/20 |
| 10,845,823 | B2* | 11/2020 | Burghardt ............ G05D 1/0825 |
| 11,379,344 | B2* | 7/2022 | Kana ........................ G06F 21/57 |
| 2006/0027404 | A1 | 2/2006 | Foxlin |
| 2009/0222776 | A1* | 9/2009 | Meers ..................... G06F 30/39 716/106 |
| 2014/0013291 | A1* | 1/2014 | Meers ..................... G06F 30/39 716/111 |
| 2014/0074397 | A1 | 3/2014 | Vanderwerf |
| 2014/0336983 | A1 | 11/2014 | Steinhardt et al. |
| 2015/0233730 | A1 | 8/2015 | Guillet et al. |
| 2017/0371329 | A1 | 12/2017 | Giering et al. |
| 2018/0259341 | A1 | 9/2018 | Aboutalib et al. |
| 2018/0283871 | A1* | 10/2018 | Kana ..................... G01C 21/20 |
| 2018/0345504 | A1 | 12/2018 | Chen et al. |
| 2021/0026374 | A1* | 1/2021 | Burghardt ........... G01C 21/1654 |

OTHER PUBLICATIONS

European Patent Office, "Communication pursuant to Article 94(3)", from EP Application No. 21193883.2, from Foreign Counterpart to U.S. Appl. No. 17/410,886, dated Feb. 28, 2023, pp. 1 through 5, Published: EP.

* cited by examiner

FAULT DETECTION, EXCLUSION, ISOLATION, AND RE-CONFIGURATION OF NAVIGATION SENSORS USING AN ABSTRACTION LAYER

CROSS REFERENCE TO RELATED APPLICATIONS

This application claims the benefit of U.S. Provisional Patent Application Ser. No. 63/074,247 entitled "FAULT DETECTION, EXCLUSION, ISOLATION, AND RE-CONFIGURATION OF NAVIGATION SENSORS USING AN ABSTRACTION LAYER" filed on Sep. 3, 2020, which is incorporated herein by reference in its entirety.

BACKGROUND

Many vehicles include multiple systems to perform various functions. Frequently, the various systems use navigational state information to perform their respective functions. The various vehicle systems may acquire the navigational state information using a navigation system architecture, where the navigation system architecture derives a vehicle state in a reference frame of interest. The vehicle state elements may include parameters like rotation rates, body accelerations, attitudes, headings, angles, velocities, and positions.

SUMMARY

Systems and methods for fault detection, exclusion, isolation, and re-configuration of navigation sensors using an abstraction layer are provided. In certain embodiments, a system includes a plurality of sensors that provide redundant sensor measurements, wherein redundancy of the redundant sensor measurements is achieved based on an independence between measurements from different physical sensor units in the plurality of sensors. The system includes a fusion function configured to receive the redundant sensor measurements from each sensor in the plurality of sensors and calculate fused navigation parameters. Further, the system includes an abstraction layer that calculates an estimated state based on the fused navigation parameters, wherein the estimated state comprises the fused navigation parameters and safety assessment information for the fused navigation parameters. Moreover, the system includes a plurality of user systems, wherein each user system in the plurality of user systems is configured to receive the estimated state from the abstraction layer.

DRAWINGS

Drawings accompany this description and depict only some embodiments associated with the scope of the appended claims. Thus, the described and depicted embodiments should not be considered limiting in scope. The accompanying drawings and specification describe the exemplary embodiments and features thereof, with additional specificity and detail, in which:

Under common practice, the various described features are not drawn to scale but are drawn to emphasize specific features relevant to the example embodiments.

DETAILED DESCRIPTION

The following detailed description refers to the accompanying drawings that form a part of the present description, which shows, through illustration, specific illustrative embodiments. However, it is to be understood that other embodiments may be used and that logical, mechanical, and electrical changes may be made.

Methods and systems described in the present disclosure provide for fault detection, isolation, exclusion, and re-configuration of navigation sensors using a fusion function and an abstraction layer. In particular, systems described herein use a combination of a fusion function and an abstraction layer between sensors and user systems, where a user system is a system that uses navigation parameters provided by the sensors or navigation parameters derived from the data from the sensors. The abstraction layer allows the sensors to operate without understanding the properties of the user systems. Likewise, the abstraction layer allows the user systems to operate without understanding the properties of the sensors. The abstraction layer may communicate an estimated state for the navigating vehicle directly to the user systems. As used herein, the estimated state for the navigating vehicle refers to parameters derived from measurements by the sensors, where the parameters describe an aspect of navigation for the vehicle. For example, the estimated state may describe rotation rates, acceleration, attitudes, headings, velocities, positions, altitudes, air data, and other data relative to the navigation of a vehicle. The estimated state may also include safety measures of the parameters derived from sensor measurements, which safety measures are described below in greater detail.

When a user system receives the estimated state for a navigating vehicle, the user system may directly determine operational limits from the received estimated state. For example, the user system may determine the operational limits by ascertaining whether the estimated state meets defined operational requirements for an operation. Thus, the abstraction layer allows the user system to operate without determining sensor availability including whether sensors are faulty.

Figure 1:
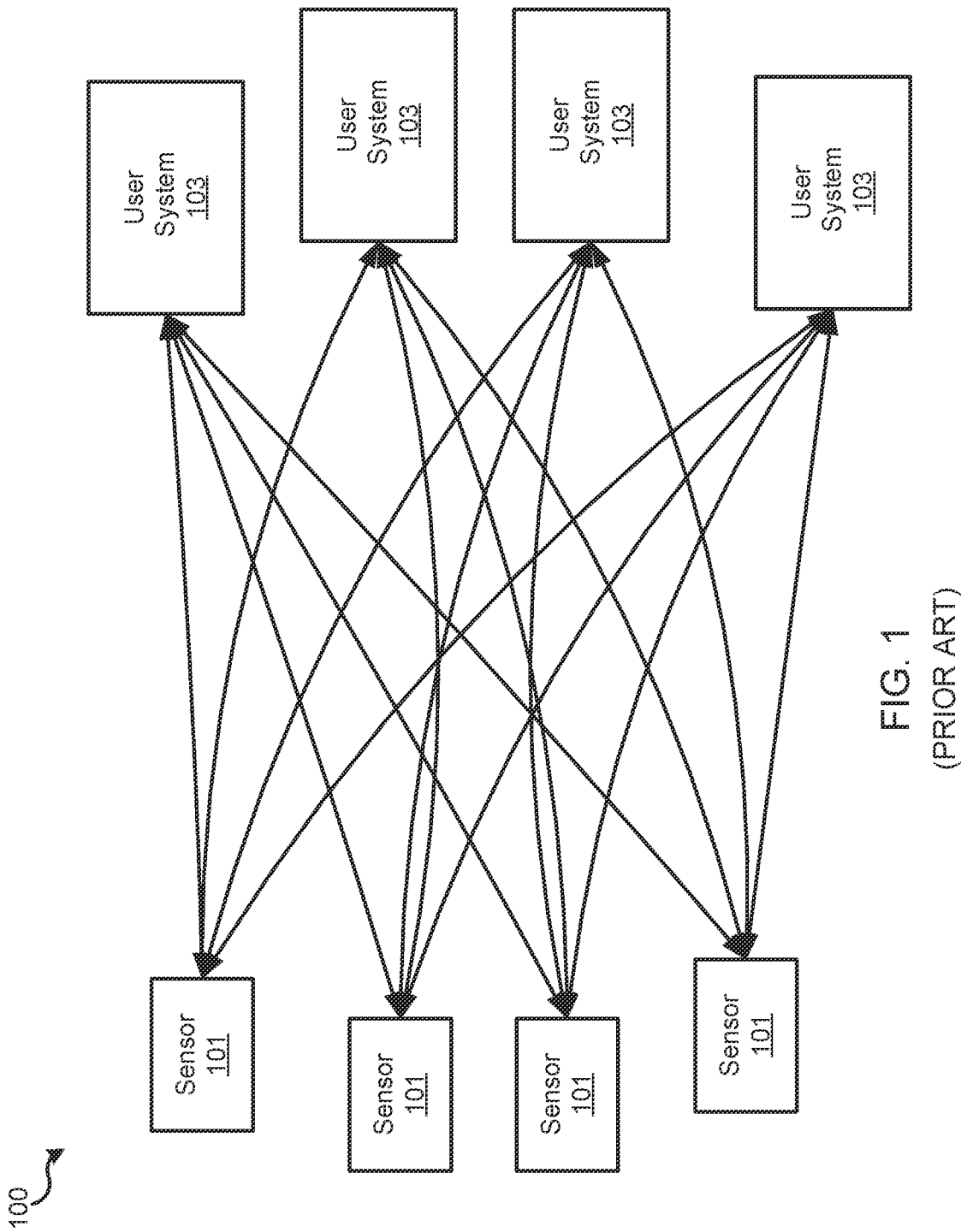
FIG. 1 is a block diagram illustrating the acquisition of sensor measurements by multiple user systems according to typical prior art.

FIG. 1 is a block diagram illustrating a typical prior art system 100 having user systems 103 that directly acquire sensor measurements from the sensors 101. A sensor 101 may be a device that provides data representing different aspects of the navigation state of the system 100. For example, a sensor 101 may be an inertial measurement unit, a global navigation satellite system receiver, an altimeter, a magnetometer, a barometer, a thermometer, or other devices that can provide information related to the navigational state of the system 100. The system 100 may also include multiple of the same sensor 101. For example, the system 100 may include multiple inertial measurement units to increase the redundancy of the measurements provided by the sensors 101. The system 100 may also include multiple sensors 101 that provide the same information. For example, the system 100 may include different sensors 101 that redundantly provide inertial measurements using different mechanisms.

In FIG. 1, the user systems 103 may be sub-systems within the system 100 that use the information provided by the sensors 101 to perform a particular operation. The user systems 103 may be systems on a vehicle, where the vehicle may be an aircraft, a spacecraft, an automobile, a seacraft, or other movable systems. While the present application refers to the user systems 103 as being associated with vehicular navigation, the user systems 103 may also be systems within a larger system or a stand-alone system that uses navigation information for non-vehicular purposes. Examples of user systems 103 may include a multi-function display, an electronic flight bag, anti-collision systems, weather tracking systems, antenna pointing systems, internal environmental control systems, anti-icing systems, personal navigation devices, biometric devices, among other systems.

The user systems 103 may use an estimate of state parameters for a vehicle during operation. Frequently, the user systems 103 receive measurements and estimates directly or indirectly from one or more of the sensors 101. When a user system 103 receives the estimate, the user system 103 may perform an operation that may include maintaining vehicle attitude, controlling pointing functions like weather radars or satellite communications, or driving the autopilot to follow an approach path, among other operations.

While the user systems 103 may use estimates of state parameters for the vehicles for automated operations, the estimated state parameters, by themselves, may not support the safe operation of the user systems 103. One or more of the sensors 101 may experience faults that may lead to Hazardously Misleading Information (HMI) or Loss of Function (LOF). These HMI or LOF failures lead to unsafe operation risks. The user systems 103 may perform safety assessments of the estimated states to reduce the unsafe operation risk. Safety assessments may include accuracy, integrity, continuity, and availability among measurements indicative of the safety of the measured parameters.

As illustrated in FIG. 1, the user systems 103 may perform safety assessments of the sensors 101 based on the operational characteristics and limits of the user system 103. To perform the safety assessments, the user systems 103 may use details of the navigation architecture that include specific properties of the sensors 101. The properties of the sensors 101 may include the quality of the sensors 101, the specific fault modes of the sensors 101, the redundancies of the sensors 101, and other properties of the sensors 101. Typically, each user system 103 performs a static, off-line analysis to perform the safety assessments. The analysis may involve operational procedures or algorithms based on observable data about the sensors 101. This decentralized, static analysis of the sensors 101 by the several user systems 103 presents several issues that affect the operation of the typical prior art system 100.

In some implementations, complex relationships exist between the potential HMI or LOF conditions for a sensor 101 and performable operations by a user system 103. Because of the complex relationships, the user systems 103 may perform complex procedures to assure that HMI or LOF for a sensor does not affect vehicle safety. For example, a Minimum Equipment List (MEL) checklist for dispatch of a user system 103 or the sensor monitoring procedure used in precision landings that are complex and generally performed by a flight crew. The performance of these and other similar tasks by a flight crew may significantly increase the workload of a flight crew.

As each user system 103, whether manual or automatic, performs a separate safety assessment for the different sensors 101, there is a complex many-to-many dependency between the user systems 103 and the sensors 101. The complex many-to-many dependency makes integration of the user systems 103 and sensors 101 difficult at a vehicle level. Given the many-to-many dependency between the sensors 101 and the user systems 103 and the resulting difficulties with vehicle integration, the updating of vehicles (in particular aircraft) is difficult after the initial certification of the vehicle. If a new user system 103 or sensor 101 becomes available within the system 100, the other sensors 101 and user systems 103 may experience challenges in using the features of the new user system 103 or sensor 101. The challenges may include accessing the new information and updating the off-line safety analysis performed with the original user systems 103 and sensors 101.

Figure 2:
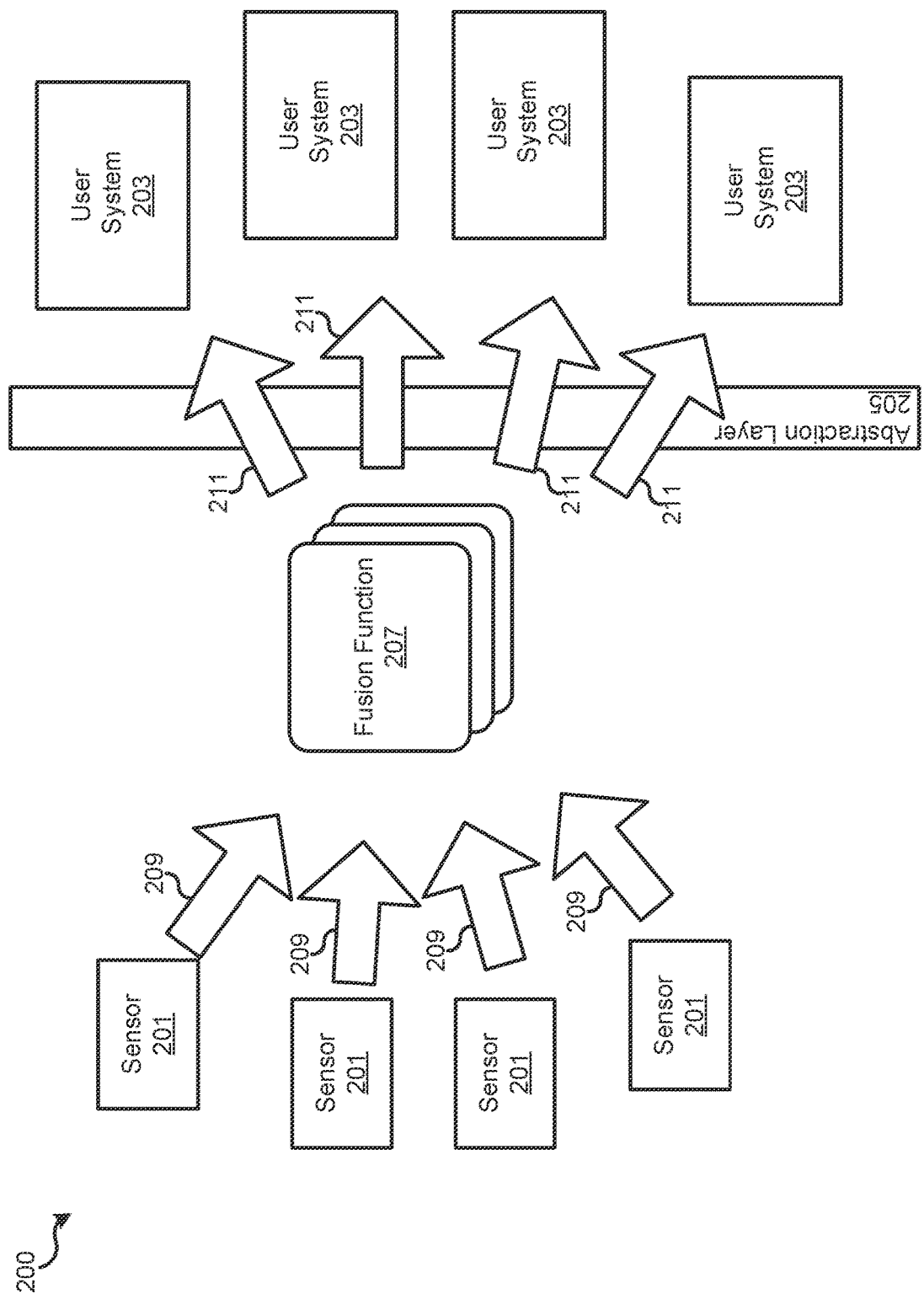
FIG. 2 is a diagram illustrating the acquisition of navigation information through an abstraction layer by multiple user systems according to the present disclosure.

FIG. 2 is a block diagram illustrating embodiments of a system 200 where user systems 203 acquire sensor measurements through a fusion function 207 and safety assessment information for sensors 201 through an abstraction layer 205. The sensors 201 function substantially similar to the function of the sensors 101 in FIG. 1. Additionally, the sensors 201 may include multiple sensors that provide measurements redundantly. The user systems 203 may perform operations similar to the operations performed by the user systems 103 in FIG. 1. However, the user systems 203 may receive the estimated state through the abstraction layer 205 instead of receiving the sensor measurements directly from the multiple sensors 201 and performing their own calculations. As used herein, the abstraction layer 205 refers to a layer between the sensors 201 and the user system 203 that provides safety assessment information for consolidated or fused measurements for use by the user systems 203, where the consolidated or fused measurements have been fused by a fusion function 207 that receives information from multiple sensors 201. The multiple sensors 201 includes at least one set of hardware sensors that provide at least one redundant measurement. Thus, the fusion function 207 fuses the information to calculate fused navigation parameters, and the abstraction layer 205 calculates safety assessment information for the fused navigation parameters and provides the fused navigation parameters and safety assessment information as an estimated state to the user systems 203. The user systems 203 may use the safety assessment information and the fused navigation parameters (which was derived from the sensor measurements and properties) without direct knowledge of the sensors 201, sensor-specific measurements, or sensor properties.

Also, the user systems 203 receive safety assessment information through the abstraction layer 205 as part of the estimated state instead of each user system 203 calculating the safety assessment information. By implementing an abstraction layer 205 between the sensors 201 and the user systems 203, the user systems 203 may operate using the provided estimated state (navigation parameters and safety assessment information) without information related to the properties of the sensors 201.

The fusion function 207 receives measurements 209 from the sensors 201 and provides fused navigation parameters to the abstraction layer 205. The abstraction layer 205 additionally calculates safety assessment information and then provides an estimated state 211 to the user systems 203. Thus, the estimated state 211 includes an estimation of navigation parameters (calculated by the fusion function 207) for the system 200 and safety assessment information (i.e., accuracy, integrity, continuity, availability, among other safety assessments) for the state of the system 200. The abstraction layer 205 may communicate the estimated state 211 directly to the different user systems 203. The safety assessment information calculated by the abstraction layer 205 primarily addresses hardware faults in the multiple sensors 201.

As mentioned above, the safety assessment information may describe the accuracy of an estimated state. For example, an accuracy safety assessment measures a difference between an estimated parameter in the estimated state and the actual parameter for the vehicle when there are no failures present. The user systems 203 may avoid performing certain operations if the accuracy for a particular state limit exceeds a particular accuracy limit. Additionally, the safety assessment information may describe the integrity of an estimated state. For example, an integrity safety assessment measures the confidence in the correctness of an estimated parameter in the estimated state. When the user system 203 receives the integrity safety assessment, the user system 203 may emit alarms upon determining that the estimated state parameter is unusable for navigation. Frequently, the integrity safety assessment defines protection levels to limit the effects of potential errors in the estimated state parameters during operation. The protection levels may represent an error bound for an estimated state parameter during operation with a specified probability of exceeding the bound.

Further, the safety assessment information may include a continuity safety assessment. The continuity safety assessment measures the ability of the system 200 to provide an estimated state during the operation of the system 200. A user system 203 receives the continuity safety assessment in terms of continuity risk, where the continuity risk is the probability that an estimated state becomes unavailable because of loss of service caused by unprogrammed interruptions. Moreover, the safety assessment information may include an availability safety assessment. The availability safety assessment measures the probability that the system 200 can produce an estimated state parameter satisfying limits related to accuracy, integrity, and continuity. Additionally, the system 200 can exclude measurements from faulted or failed sensors to ensure continuity.

When the abstraction layer 205 directly communicates the estimated state 211 to the user systems 203, the user systems 203 may determine whether operations typically performed by the respective user system 203 are possible. For example, a user system 203 determines that an associated operation is possible by comparing the estimated state 211 against operational navigation error limits (e.g., alert limits) for the associated operation. The user system 203 may compare the estimated state 211 against the operational navigation error limits without determining whether sensors 201 are unavailable because they have failed or are faulty.

As stated above, the system 200 includes a fusion function 207. The fusion function 207 may be a function that receives the measurements 209 from the multiple sensors 201 and fuses the measurements to calculate navigation parameters as part of the estimated state 211. Hence, the fusion function 207 may also be referred to as a consolidation function. The fusion function 207 may use brute force techniques to fuse the measurements, statistical filters (e.g., Kalman filtering), or other sensor fusion techniques. When the fusion function 207 uses brute force techniques, the fusion function 207 may apply different weights to the measurements 209 from the multiple sensors 201 and identify the weight combinations that yield more accurate measurements. Also, the fusion function 207 may apply weights to the measurements 209 based on information regarding the integrity or continuity of the measurements provided by the multiple sensors 201. The fusion function 207 then provides the fused measurements or fused navigation parameters to the abstraction layer 205.

The system 200 may form the abstraction layer 205 by determining estimated state parameters that include the accuracy, integrity, continuity, and availability associated with the navigation parameters calculated by the fusion function 207. For example, the abstraction layer 205 may use Kalman filtering or other statistical filters to determine the estimated state and accuracy information.

Further, the system 200 may form the abstraction layer 205 by calculating integrity information. The abstraction layer 205 may form the integrity information by communicating the faulted error limits at higher risk levels consistent with higher levels of safety criticality. Typically, integrity risk levels are probabilities of HMI. For example, the different risk levels of safety criticality for the probabilities of HMI may be $<10^{-3}$ (minor), $<10^{-5}$ (major), $<10^{-7}$ (hazardous), and $<10^{-9}$ (catastrophic). The abstraction layer 205 may communicate a bound of HMI for a risk level by broadcasting a protection level for a particular measurement. The abstraction layer 205 may communicate the integrity at multiple risk levels by sending different protection levels for the associated safety-criticality probabilities. When a user system 203 receives the different protection levels for a state estimate parameter, the user system 203 may select an appropriate protection level for the safety criticality of a particular operation. Additionally, the abstraction layer 205 and the fusion function 207 may perform exclusions of certain sensor measurements based on the integrity information. For example, the protection levels provided by the abstraction layer 205 to the user systems 203 may be based on different combinations of measurements from the sensors 201. Further, the user systems 203 may perform different actions associated with the different risk levels communicated through the abstraction layer 205. For example, the user system 203 may set a bit to indicate that the protection level exceeds a particular threshold for a risk level and what actions can be performed based on the protection levels for a particular risk level.

In some embodiments, the protection bounds calculated by the abstraction layer 205 may consider multiple failure types. The different failure types include HMI due to a hardware fault and a failure in a redundant sensor. The different failure types may include a common cause failure such as a GNSS satellite failure, or other already existing standardized failure modes. The bound must also consider fault-free scenarios where the sensor noise alone can lead to HMI. The abstraction layer 205 may determine the protection levels using a Kalman filter/solution separation (KF/SS) method, piecewise convolution methods like point mass filters, and other methods. For example, the abstraction layer 205 may determine protection levels for a position estimate or other state estimates. Further, the abstraction layer 205 may also determine the protection bounds using a fault tree analysis or similar analysis. When using fault tree analysis, a real-time system may perform the analysis. For example, the abstraction layer 205 may trade off individual integrity margins to ensure that the estimated state meets a desired integrity.

The system 200 may also establish a time to alarm (TTA) as an output used by the user systems 203. Additionally, the system 200 may establish multiple TTAs for the different risk levels. In some embodiments, for each parameter in the estimated state, the abstraction layer 205 may define any arbitrary combination of the integrity settings (PHMI, TTA, continuity, etc.). The provision of different combinations of the integrity settings is described in greater detail below in connection with FIG. 4.

The abstraction layer 205 may determine continuity risk using failure rate analysis and fault tree mechanisms while computing an exclusion level. The exclusion level provides a bound on a protected parameter that cannot be exceeded for longer than the time to exclusion (TTE) before measurements produced by the faulted sensor are excluded.

In exemplary embodiments, the abstraction layer 205 may communicate continuity risk by synthesizing a composite continuity risk that a user system 203 may evaluate against a specific exposure time. The system 200 may also provide multiple continuity risk values at different safety probabilities. The system 200 may determine the availability using classic assessment methods like an instrument landing system (ILS) signal validation or GNSS availability analysis. The system 200 may perform the availability function automatically instead of manually.

In some embodiments, the system 200 may use the abstraction layer 205 to safely execute a particular operation. For example, the system 200 may use information provided by the abstraction layer 205 to perform required navigational procedures (RNP) such as an RNP-0.1 approach. When performing an RNP-0.1 approach, the system 200 may provide a horizontal protection level less than ~0.2 nm that corresponds to an integrity level of $10^{-7}$ for any operation. The continuity may meet $10^{-5}$ for the approach period, which may be ~3 minutes. The user system 203 (such as a flight management system (FMS)) may directly look up the alert limit for the $<10^{-9}$ (Hazardous) hazard level and compare the looked-up alert limit to the ~0.2 nm protection level. The system 200 may determine the continuity for this operation by using the continuity failure rate from the abstraction layer 205 for the horizontal position and evaluate the horizontal position exclusion capability against the operation time (~3 min). If the applicable exclusion level grows during the approach (for example, because of loss of GNSS signals), the operation may be appropriately terminated.

In a further example, the system 200 may use the abstraction layer 205 when stabilizing an aircraft based on attitude. A flight control unit may receive state estimates for attitudes and an associated $<10^{-9}$ (Catastrophic) protection level. If the protection level exceeds the alert limit associated with safe aircraft operation, the system 200 may perform emergency procedures. The system 200 may also determine continuity for the expected length of a flight by evaluating the failure rate to see if the probability of loss exceeds a value commensurate with its hazard classification, such as $<10^{-9}$ tied to the associated attitude bound (Catastrophic). Using an abstraction layer 205 may allow flight crews to perform tasks without manually verifying a Minimum Equipment List (MEL).

In certain embodiments, the abstraction layer 205 may communicate the estimated state 211 to the user systems 203 through several communication mechanisms. For example, the abstraction layer 205 may communicate the estimated state 211 through a full data broadcast, subscription broadcast, or query and response protocols. The protocols may allow for bandwidth optimization on a vehicle associated with the system 200. Also, communication backbones (like ARINC 664) may communicate the estimated state 211 at a high data rate. The abstraction layer 205 may also communicate the estimated state 211 through a hardwired or wireless connection. Further, in some implementations not shown in the figures, the user systems 203 may transmit information back to the abstraction layer 205.

In certain embodiments, the system 200 may include one or more processors and memory units, where one or more memory units store instructions that direct processors to perform the fusion function 207 and implement the abstraction layer 205. Additionally, the user systems 203 may also include associated processors and memory units. A processor may be implemented using software, firmware, hardware, or other appropriate combinations thereof. The processor and/or other computational devices may be supplemented by, or incorporated in, specially designed application-specific integrated circuits (ASICs) or field programmable gate arrays (FPGAs). The processor may be a general or special purpose computer or processor, or other programmable logic devices. The processor and other computation devices may also include or function with software programs, firmware, or other computer-readable instructions for carrying out various process tasks, calculations, and control functions used in the present methods and systems.

Further, computer-executable instructions (such as program modules or components) may implement the methods described in this description. At least one processor may execute the computer-executable instructions. Software, firmware, or other execution-capable devices may execute the computer-readable instructions for carrying out various process tasks, calculations, and generation of data used in the operations of the described methods. The computer-readable instructions may be stored as part of one or more appropriate computer-program products, where a computer-program product may be a set of computer-readable instructions or data structures stored on a computer-readable medium. The computer-readable medium may be a media that stores data that the processor or other computing device can access. In certain implementations, the computer-readable medium may form part of a memory unit.

Computer-readable mediums may include non-volatile memory devices. Non-volatile memory devices may include semiconductor memory devices such as random access memory (RAM), read-only memory (ROM), electrically erasable programmable ROM (EEPROM), or flash memory devices. The non-volatile memory devices may also include magnetic disks (such as internal hard disks or removable disks), optical storage devices (such as compact discs (CDs), digital versatile discs (DVDs), Blu-ray discs), or other media that can store computer-executable instructions or data structures.

In exemplary embodiments, the implementation of an abstraction layer 205 and fusion function 207 allows for much of the specific sensor failure detection, isolation, and re-configuration work to be performed and communicated through the abstraction layer 205 instead of being performed by the user systems 203. Further, the data communicated through the abstraction layer 205 may be easier for users to understand directly. For example, the total position bound received through the abstraction layer 205 may be viewable on a multi-function display plan view. A user may view the total position bound against operational information like the programmed flight plans or local terrain features. Viewing the total position bound against operation information may be a simpler cognitive task than trying to glean that information from the assessment of the individual sensor performances, some of which may not directly measure position.

In further embodiments, for vehicle integrators, reducing the many-to-many dependency between the sensors 201 and the user systems 203 may divide the integration problem into two parts. The first part being sensors 201 to the abstraction layer 205, and the second part being the abstraction layer 205 to the user systems 203. The division of integration may reduce the number of required interfaces and the complexity of the system 200 by an order of magnitude. The abstraction layer 205 may be easy to simulate and validate from both the side of the sensors 201 and the side of the user system 203.

In additional embodiments, the user systems 203 may benefit as the abstraction layer 205 may provide improved performance concerning the estimated state 211. The improved performance may facilitate upgrading the user systems 203 to incorporate additional operational capabilities without changing the sensors 201 or updating the sensor analysis. For example, the abstraction layer 205 may provide the estimated state 211 to the user systems 203, where the estimated state 211 is determined by the abstraction layer 205 independent of characteristics of the user systems 203. Accordingly, the user systems 203 can be upgraded, changed, reconfigured, degrade, or experience any other change in operation without affecting the consolidated state estimate provided by the abstraction layer 205. Additionally, the only connection to be made between a user system 203 and the sensors 201 is the connection between the user system 203 and the abstraction layer 205. Thus, changing or adding a user system 203 affects a single connection, which is an improvement over the multiple affected connections that would result from changing the user systems 103 in FIG. 1.

In some embodiments, breaking the many-to-many dependency, illustrated in FIG. 1, using the abstraction layer 205 may also facilitate adding sensors 201. The addition of sensors 201 may be visible through the abstraction layer 205 as the estimated state 211 may improve because of the additional sensors 201. For example, when adding a sensor 201, the fusion function 207 fuses the measurements from the added sensor 201 with the already connected sensors 201. Based on the characteristics of the added sensor 201 and the measurements from the added sensor 201, the abstraction layer 205 calculates a new estimated state 211. The abstraction layer 205 will then provide the new estimated state 211 to the user systems 203. As stated, the user systems 203 are indirectly aware that configuration changes have occurred to the sensors 201 because of changes in the estimated state 211 provided by the abstraction layer 205. However, the user systems 203 are unaware of any specific changes to the configuration of the sensors 201. Thus, the abstraction layer 205 and the fusion function 207 simplify updating and certifying the system 200 along with the operation of any associated vehicles because the sensors 201 and user systems 203 can be updated by connecting the changed sensors 201 and user systems 203 to the fusion function 207 and the abstraction layer 205, where the fusion function 207 and the abstraction layer 205 make adjustments for changes to the system 200.

Figure 3:
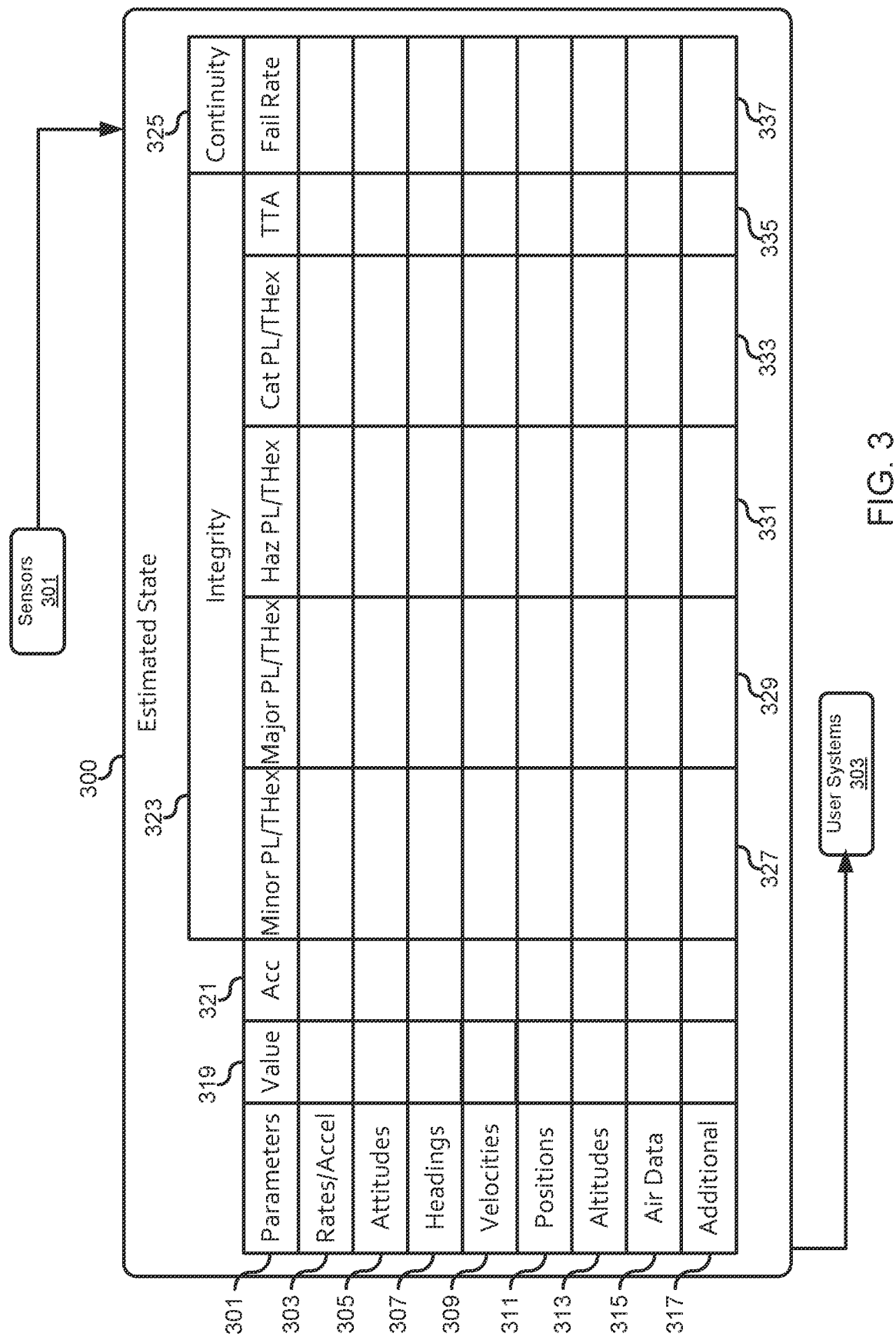
FIG. 3 is a table illustrating exemplary information describing an estimated state of a vehicle provided to the user systems through the abstraction layer according to the present disclosure.

FIG. 3 is a table illustrating exemplary information provided to the user systems 203 through the abstraction layer 205. As shown, the abstraction layer 205 may present an estimated state 300 that shows estimated state parameters for a system. The estimated state 300 refers to the estimated state of a vehicle or other object based on the fused measurements from the available sensors 201. As shown, the estimated state 300 may show estimated parameters and information describing the parameters for rates/accelerations 303, attitudes 305, headings 307, velocities 309, positions 311, altitudes 313, air data 315, and additional information 317. The list of information presented in the estimated state 300 is not all-inclusive, and other information related to the state of the aircraft may be shown. The estimated state 300 may also be referred to as a consolidated state or fused state as the presented estimated state 300 represents the information after the abstraction layer 205 and fusion function 207 consolidate (fuse) the measurements from multiple sensors.

In some embodiments, the estimated state 300 may provide information related to the various estimated state parameters. For example, the estimated state 300 may provide a value 319, where the value 319 represents an estimate of a particular parameter 301. Also, the estimated state 300 may provide an accuracy assessment 321, where the accuracy assessment 321 is a value showing the accuracy associated with a parameter 301. For example, the accuracy assessment 321 may show a 95% accuracy value for a parameter 301.

In additional embodiments, the estimated state 300 may provide integrity information 323 for the provided parameters 301. The integrity information 323 may include a minor protection level and/or exclusion threshold 327, where the minor protection level and/or exclusion threshold 327 corresponds to a minor hazard with a probability $<10^{-3}$. The integrity information 323 may also include a major protection level and/or exclusion threshold 329, where the major protection level and/or exclusion threshold 329 corresponds to a major hazard with a probability $<10^{-5}$. The integrity information 323 may also include a hazardous protection level and/or exclusion threshold 331, where the hazardous protection level and/or exclusion threshold 331 corresponds to a hazardous hazard with a probability $<10^{-7}$. The integrity information 323 may also include a catastrophic protection level and/or exclusion threshold 333, where the catastrophic protection level and/or exclusion threshold 333 corresponds to a catastrophic hazard with a probability $<10^{-9}$. The integrity information 323 may also include a time-to-alert 335, where the time-to-alert is the interval of time between when a fault causes an integrity protection level to be exceeded and when the fault is annunciated in the outputs or mitigated, such as by sensor exclusion.

In further embodiments, the estimated state 300 may include continuity information 325. The continuity information 325 may include a continuity risk 337, where the continuity risk 337 is an estimate of the risk associated with a loss of function for the parameter based on a current operational state of sensors 201 and fusion function. The user systems 203 may use the continuity risk to determine probabilities for loss of function based on applicable exposure times for the user systems 203.

Figure 4:
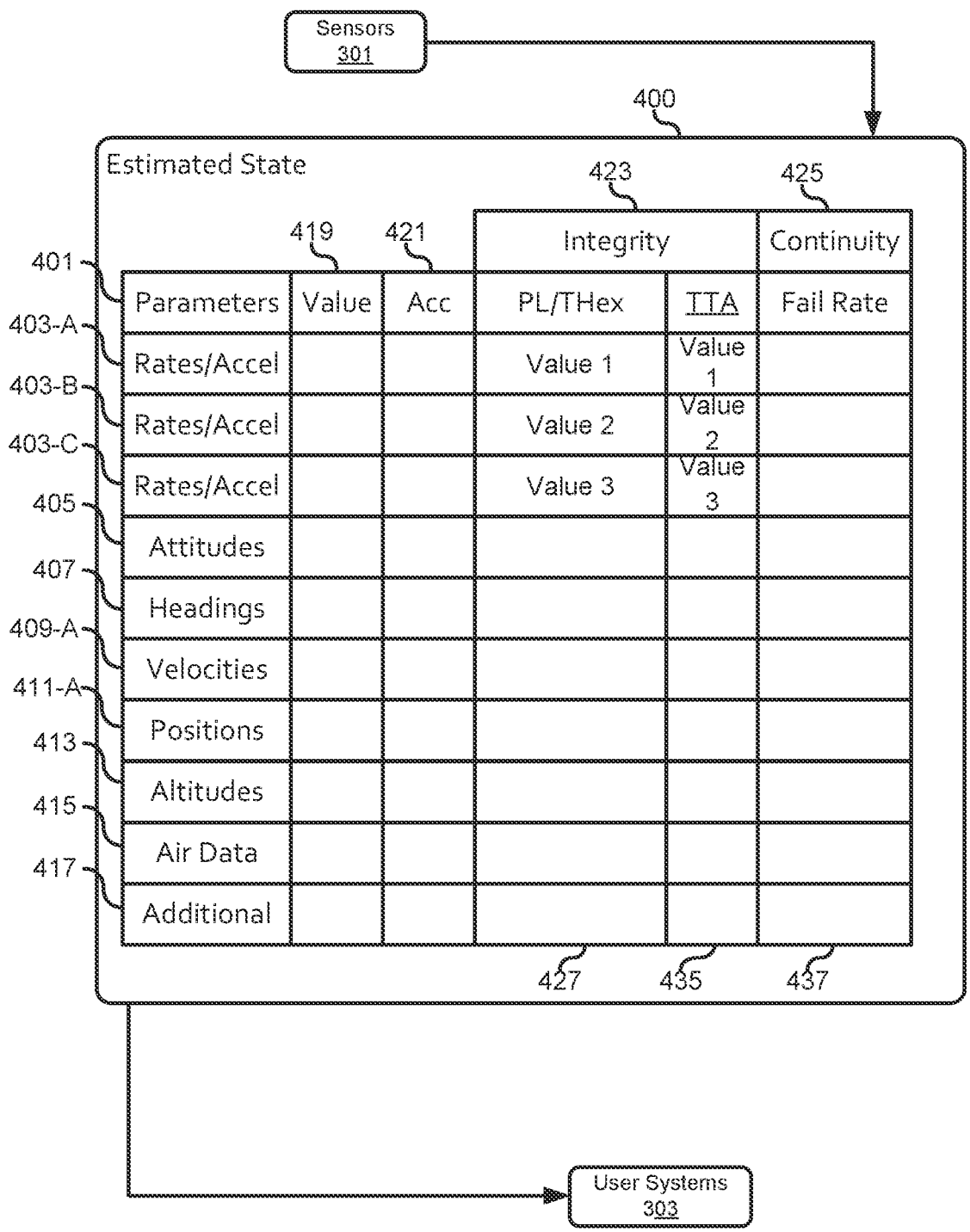
FIG. 4 is a table illustrating exemplary information describing an estimated state of a vehicle for different combinations of integrity settings according to the present disclosure.

FIG. 4 is a table showing the estimated state 400, where the table shows the calculation of estimated parameters for different combinations of integrity settings. For example, the estimated state 400 may estimate different protection levels for different TTAs. As shown, the estimated state 400 may have three different TTAs for the estimated parameters for rates/accelerations 403-A-403-B. For the first rate/acceleration parameter 403-A, the abstraction layer 205 and fusion function 207 may calculate a protection level and/or exclusion level 427 having a first value that is associated with a first TTA (TTE) value. Additionally, for the second rate/acceleration parameter 403-B, the abstraction layer 205 and fusion function 207 may calculate a protection level and/or exclusion level 427 having a second value that is associated with a second TTA (TTE) value. Moreover, for the third rate/acceleration parameter 403-C, the abstraction layer 205 and fusion function 207 may calculate a protection level and/or exclusion threshold 427 having a third value that is associated with a third TTA (TTE) value. As shown, the abstraction layer 205 and fusion function 207 calculate the other estimated parameters and associated values in much the same way as described above in FIG. 3. By computing different combinations of integrity settings, the abstraction layer 205 and the fusion function 207 allow user systems 203 to select a protection level (or other measurement) associated with a desired TTA (TTE) or other value.

Figure 5:
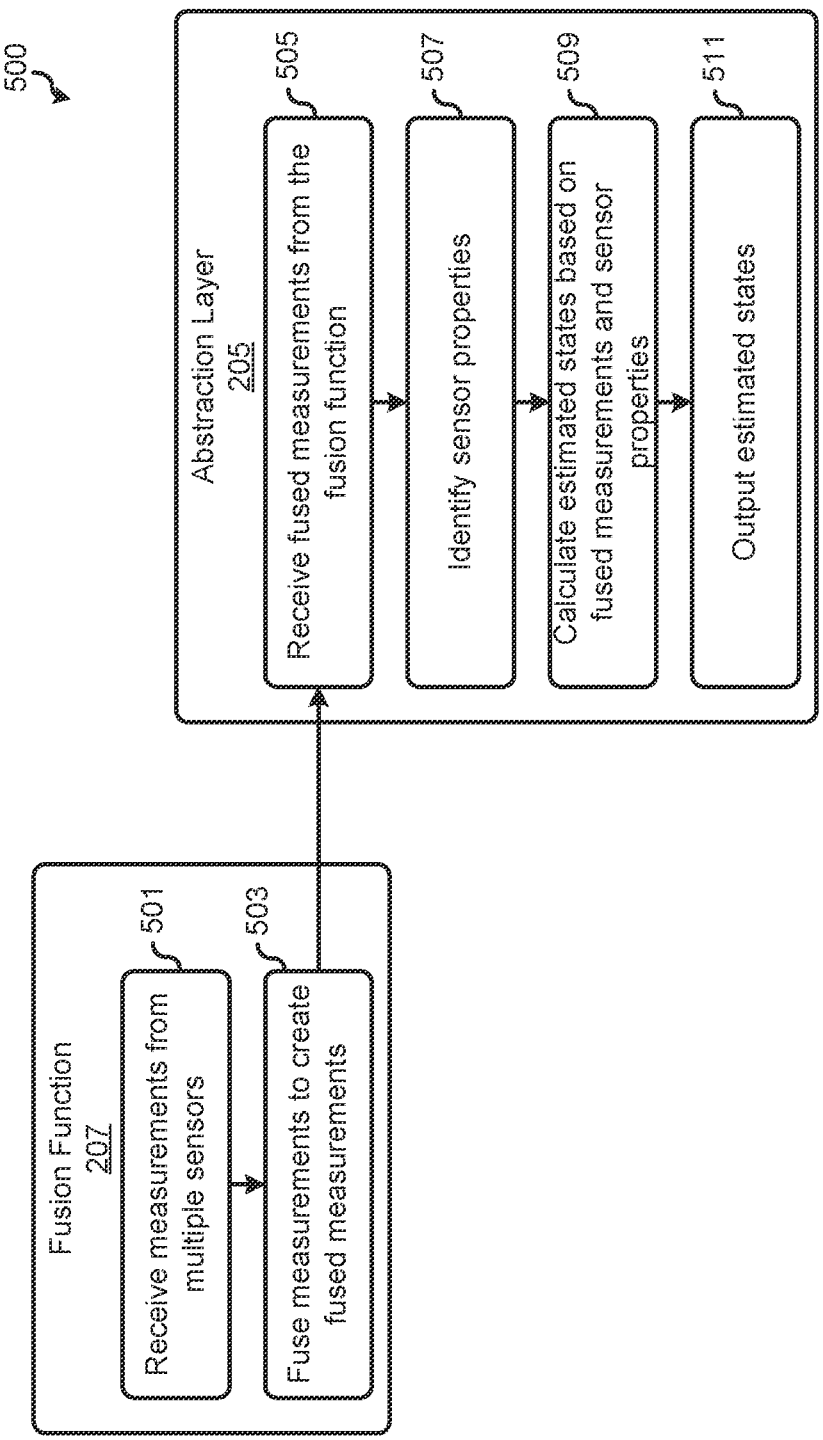
FIG. 5 is a flowchart illustrating the operation of the fusion function with the abstraction layer according to the present disclosure.

FIG. 5 is a flowchart diagram illustrating a method 500 for the operation of the fusion function 207 and the abstraction layer 205 as described above. Within the fusion function 207, the method 500 proceeds at 501, where measurements are received from multiple sensors. The method 500 proceeds at 503, where the measurements are fused to create fused measurements.

In additional embodiments, within the abstraction layer 205, the method 500 proceeds at 505, where the fused measurements are received from the fusion function. Further, the method 500 proceeds at 507, where sensor properties are identified. Also, the method 500 proceeds at 509, where an estimated state is calculated based on the fused measurements and the sensor properties. Moreover, the method 500 proceeds at 511, where the estimated state is provided as an output. As described above, the estimated state includes safety assessment information and the fused measurements. The user systems 203 may then use the information in the estimated state during their operation.

Figure 6:
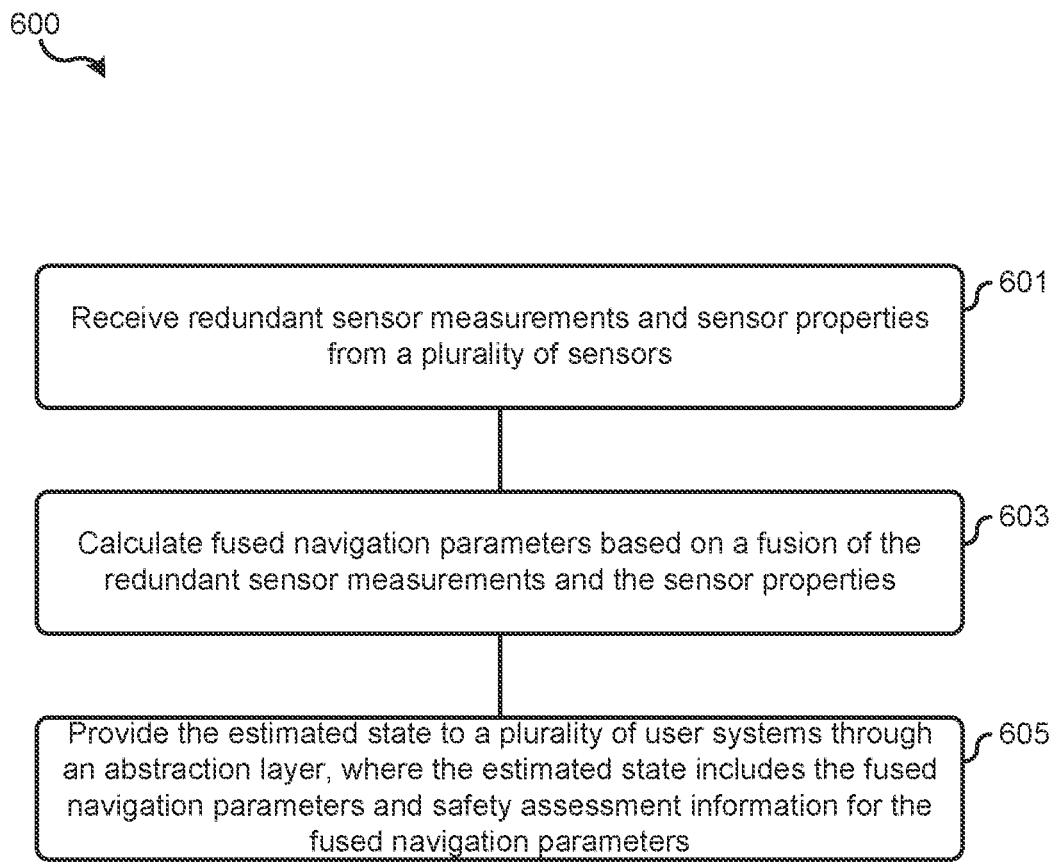
FIG. 6 is a flowchart diagram of a method for implementing a fusion function and an abstraction layer according to the present disclosure.

FIG. 6 is a flowchart diagram of a method 600 for providing an estimated state to user systems. The method 600 proceeds at 601, where redundant sensor measurements and sensor properties are received from a plurality of sensors. For example, the redundancy of the redundant sensor measurements is achieved based on an independence between measurements from different physical sensor units. The method 600 also proceeds at 603, where fused navigation parameters are calculated based on a fusion of the redundant sensor measurements and the sensor properties. Further, the method 600 proceeds at 605, where the estimated state is provided to a plurality of user systems through an abstraction layer, where the estimated state includes the fused navigation parameters and safety assessment information for the fused navigation parameters.

Example Embodiments

Example 1 includes a method comprising: receiving redundant sensor measurements and sensor properties from a plurality of sensors, wherein redundancy of the redundant sensor measurements is achieved based on an independence between measurements from different physical sensor units; calculating fused navigation parameters based on a fusion of the redundant sensor measurements and the sensor properties; and providing an estimated state to a plurality of user systems through an abstraction layer, wherein the estimated state comprises the fused navigation parameters and safety assessment information for the fused navigation parameters.

Example 2 includes the method of Example 1, wherein the estimated state comprises estimated state parameters.

Example 3 includes the method of Example 2, wherein the safety assessment information further comprises at least one of accuracy safety assessment, integrity safety assessment, continuity safety assessment, and availability safety assessment for at least one of the estimated state parameters.

Example 4 includes the method of Example 3, wherein the safety assessment information further comprises multiple combinations of the accuracy safety assessment, the integrity safety assessment, the continuity safety assessment, and the availability safety assessment for the at least one of the estimated state parameters.

Example 5 includes the method of any of Examples 3-4, wherein the integrity safety assessment comprises error distributions at confidence risk levels associated with levels of safety criticality.

Example 6 includes the method of any of Examples 3-5, wherein calculating the safety assessment information comprises determining the integrity safety assessment using at least one of: a Kalman filter/solution separation method; a piecewise convolution method; and a fault tree analysis.

Example 7 includes the method of any of Examples 4-6, further comprising performing Kalman filtering to calculate the estimated state.

Example 8 includes the method of any of Examples 1-7, further comprising adding a sensor to the plurality of sensors, wherein adding the sensor comprises: connecting the sensor to the abstraction layer; updating the estimated state; and providing the updated estimated state to the plurality of user systems.

Example 9 includes the method of any of Examples 1-8, wherein providing the estimated state to the plurality of user systems comprises sending the estimated state through at least one of: a full data broadcast; a subscription broadcast; and a query and response protocol.

Example 10 includes a system comprising: a plurality of sensors that provide redundant sensor measurements, wherein redundancy of the redundant sensor measurements is achieved based on an independence between measurements from different physical sensor units in the plurality of sensors; a fusion function configured to receive the redundant sensor measurements from each sensor in the plurality of sensors and calculate fused navigation parameters; an abstraction layer that calculates an estimated state based on the fused navigation parameters, wherein the estimated state comprises safety assessment information for the fused navigation parameters and the fused navigation parameters; and a plurality of user systems, wherein each user system in the plurality of user systems is configured to receive the estimated state from the abstraction layer.

Example 11 includes the system of Example 10, wherein the fused navigation parameters comprise estimated state parameters.

Example 12 includes the system of any of Examples 10-11, wherein the safety assessment information comprises at least one of an accuracy safety assessment, integrity safety assessment, continuity safety assessment, and availability safety assessment for at least one of the estimated state parameters.

Example 13 includes the system of Example 12, wherein the integrity safety assessment comprises error distributions at confidence risk levels associated with levels of safety criticality.

Example 14 includes the system of any of Examples 12-13, wherein the abstraction layer determines the integrity safety assessment using at least one of: a Kalman filter/solution separation method; a piecewise convolution method; and a fault tree analysis.

Example 15 includes the system of any of Examples 12-14, wherein the integrity safety assessment comprises a time-to-alarm.

Example 16 includes the system of any of Examples 10-15, wherein the abstraction layer performs Kalman filtering to calculate the safety assessment information.

Example 17 includes the system of any of Examples 10-16, wherein the abstraction layer provides the estimated state to the plurality of user systems using at least one of: a full data broadcast; a subscription broadcast; and a query and response protocol.

Example 18 includes a system comprising: a plurality of sensors that provide sensor measurements; a fusion function configured to receive the sensor measurements and create fused measurements; an abstraction layer configured to: receive the fused measurements from the fusion function; calculate safety assessment information based on the fused measurements; and provide the fused navigation parameters and the safety assessment information as an output; and a plurality of user systems that receives the navigation parameters and the safety assessment information from the abstraction layer, wherein at least one user system in the plurality of user systems determines operational capability for the at least one user system based on the fused navigation parameters and the safety assessment information.

Example 19 includes the system of Example 18, wherein the safety assessment information comprises at least one of an accuracy safety assessment, integrity safety assessment, continuity safety assessment, and availability safety assessment for at least one of the estimated state parameters.

Example 20 includes the system of Example 19, wherein the integrity safety assessment comprises error distributions at confidence risk levels associated with levels of safety criticality.

Although specific embodiments have been illustrated and described, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   receiving, by a fusion function, redundant navigation sensor measurements from a plurality of sensors, wherein redundancy of the redundant navigation sensor measurements is achieved based on an independence between measurements from different physical sensor units;
   calculating, by the fusion function, fused navigation parameters based on a fusion of the redundant navigation sensor measurements; and
   providing, by the fusion function, fused navigation parameters to an abstraction layer;
   calculating, by the abstraction layer, an estimated state, wherein the estimated state comprises the fused navigation parameters and safety assessment information for the fused navigation parameters, wherein the safety assessment information describes the accuracy of the estimated state;
   providing, by the abstraction layer, the estimated state to a plurality of user systems.

2. The method of claim 1, wherein the estimated state comprises estimated state parameters.

3. The method of claim 2, wherein the safety assessment information further comprises at least one of accuracy safety assessment, integrity safety assessment, continuity safety assessment, and availability safety assessment for at least one of the estimated state parameters.

4. The method of claim 3, wherein the safety assessment information further comprises multiple combinations of the accuracy safety assessment, the integrity safety assessment, the continuity safety assessment, and the availability safety assessment for the at least one of the estimated state parameters.

5. The method of claim 4, further comprising performing Kalman filtering to calculate the estimated state.

6. The method of claim 3, wherein the integrity safety assessment comprises error distributions at confidence risk levels associated with levels of safety criticality.

7. The method of claim 3, wherein calculating the safety assessment information comprises determining the integrity safety assessment using at least one of:
   a Kalman filter/solution separation method;
   a piecewise convolution method; and
   a fault tree analysis.

8. The method of claim 1, further comprising adding a sensor to the plurality of sensors, wherein adding the sensor comprises:
   connecting the sensor to the abstraction layer;
   updating the estimated state; and
   providing the updated estimated state to the plurality of user systems.

9. The method of claim 1, wherein providing the estimated state to the plurality of user systems comprises sending the estimated state through at least one of:
   a full data broadcast;
   a subscription broadcast; and
   a query and response protocol.

10. A system comprising:
    a plurality of sensors that provide redundant sensor measurements, wherein redundancy of the redundant sensor measurements is achieved based on an independence between measurements from different physical sensor units in the plurality of sensors;
    a fusion function configured to receive the redundant sensor measurements from each sensor in the plurality of sensors, calculate fused navigation parameters, and provide the fused navigation parameters to an abstraction layer;
    the abstraction layer configured to calculates an estimated state based on the fused navigation parameters, wherein the estimated state comprises safety assessment information for the fused navigation parameters and the fused navigation parameters, wherein the safety assessment information describes the accuracy of the estimated state; and
    a plurality of user systems, wherein the abstraction layer is configure to provide the estimation state to each user system in the plurality of user systems.

11. The system of claim 10, wherein the fused navigation parameters comprise estimated state parameters.

12. The system of claim 10, wherein the safety assessment information comprises at least one of an accuracy safety assessment, integrity safety assessment, continuity safety assessment, and availability safety assessment for at least one of the estimated state parameters.

13. The system of claim 12, wherein the integrity safety assessment comprises error distributions at confidence risk levels associated with levels of safety criticality.

14. The system of claim 12, wherein the abstraction layer determines the integrity safety assessment using at least one of:
    a Kalman filter/solution separation method;

a piecewise convolution method; and
a fault tree analysis.

15. The system of claim 12, wherein the integrity safety assessment comprises a time-to-alarm.

16. The system of claim 10, wherein the abstraction layer performs (Original) Kalman filtering to calculate the safety assessment information.

17. The system of claim 10, wherein the abstraction layer provides the estimated state to the plurality of user systems using at least one of:
   a full data broadcast;
   a subscription broadcast; and
   a query and response protocol.

18. A system comprising:
   a plurality of sensors that provide redundant navigation sensor measurements, wherein redundancy of the redundant sensor measurements is achieved based on an independence between measurements from different physical sensor units;
   a fusion function configured to receive the redundant navigation sensor measurements and create fused measurements;
   an abstraction layer configured to:
      receive the fused measurements from the fusion function;
      calculate safety assessment information based on the fused measurements, wherein the safety assessment information describes the accuracy of the fused measurements; and
      provide the fused measurements and the safety assessment information as an output; and
   a plurality of user systems that receives the navigation parameters and the safety assessment information from the abstraction layer, wherein at least one user system in the plurality of user systems determines operational capability for the at least one user system based on the fused navigation parameters and the safety assessment information.

19. The system of claim 18, wherein the safety assessment information comprises at least one of an accuracy safety assessment, integrity safety assessment, continuity safety assessment, and availability safety assessment for at least one of the estimated state parameters.

20. The system of claim 19, wherein the integrity safety assessment comprises error distributions at confidence risk levels associated with levels of safety criticality.

* * * * *